United States Patent [19]
Effland

[11] 3,894,057
[45] July 8, 1975

[54] TETRAHYDROBENZOFURANYLPHENOX-YCARBOXYLIC ACIDS, ESTERS

[75] Inventor: Richard C. Effland, Somerville, N.J.

[73] Assignee: American Hoechst Corporation, Bridgewater, N.J.

[22] Filed: May 28, 1974

[21] Appl. No.: 474,010

[52] U.S. Cl............................ 260/346.2 R; 424/285
[51] Int. Cl.................................................. C07d 5/40
[58] Field of Search .............................. 260/346.2 R

[56] References Cited
UNITED STATES PATENTS
3,520,906    7/1970    Binon et al. .................... 260/346.2

*Primary Examiner*—Henry R. Jiles
*Assistant Examiner*—Bernard I. Dentz
*Attorney, Agent, or Firm*—Curtis, Morris & Safford

[57] ABSTRACT

Tetrahydrobenzofuranylphenoxycarboxylic acids, their esters and salts, and a process for their preparation thereof are described. The compounds are useful as anti-inflammatory and analgesic agents.

4 Claims, No Drawings

TETRAHYDROBENZOFURANYLPHENOXYCARBOXYLIC ACIDS, ESTERS

This invention relates to tetrahydrobenzofuranylphenoxyacetic acids and to esters and salts thereof as anti-inflammatory and analgesic agents; and to a process for their preparation.

The compounds of the invention conform to the general formula:

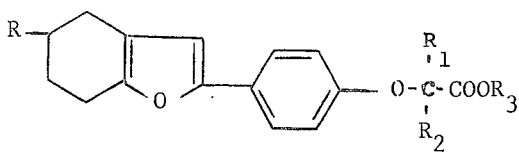

in which R is hydrogen or alkyl of from 1 to 4 carbon atoms; $R_1$ is hydrogen, methyl or ethyl; $R_2$ is hydrogen, methyl, ethyl or phenyl; and $R_3$ is hydrogen or alkyl of from 1 to 3 carbon atoms.

The compounds of the invention can be prepared by reacting p-hydroxyphenacyl bromide with a pyrrolidinocyclohexene of the formula

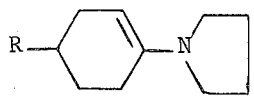

in which R is hydrogen or alkyl of 1 to 4 carbon atoms in a suitable solvent such as dimethylformamide at about 25° C. to form the corresponding 2-(p-hydroxyphenacyl)cyclohexanone, bubbling anhydrous hydrogen chloride through a solution thereof in a solvent such as absolute methanol, and then reacting the resulting 2-(p-hydroxyphenyl)-4,5,6,7-tetrahydrobenzofuran with an α-bromocarboxylic acid ester of the formula $BrC(R_1R_2)COOR_3$, wherein $R_1$, $R_2$ and $R_3$ are as defined earlier, in an organic solvent at reflux conditions for from 1 hour to 96 hours to yield the corresponding 2-[p-(4,5,6,7-tetrahydrobenzofuran-2-yl)phenoxy]carboxylic acid ester. In a preferred embodiment of the method, an acid scavenger such as potassium carbonate is added to the reaction mixture and the organic solvent is 2-butanone.

The resulting ester can be saponified in a solvent such as aqueous tetrahydrofuran to give an alkali metal salt of the acid corresponding to the ester. The corresponding free acid is obtainable by the addition of an acid to the salt.

Alternatively, the 2-(p-hydroxyphenyl)-4,5,6,7-tetrahydrobenzofuran intermediate can be reacted with a ketone, base and chloroform at reflux conditions for from 30 minutes to 24 hours to yield a compound of the invention in the form of an alkali metal salt. The free acid is obtained by the addition of an acid the reaction mixture. In a preferred embodiment of this method, acetone is the ketone, and the reaction time is about 11 hours.

The compounds of the invention are useful as antiinflammatory agents due to their ability to suppress inflammation in mammals. The activity of the compounds is demonstrated in the carregeenin induced rat paw edema antiinflammatory assay [Proc. Soc. Expt'l. Biol. Med., III, 544 (1962); J. Pharmacol. Exp. Ther., 141, 369 (1963)]. For example, at doses of 200 mg/kg of body weight, p-(4,5,6,7-tetrahydrobenzofuran-2-yl)phenoxyacetic acid, and 2-[p-(4,5,6,7-tetrahydrobenzofuran-2-yl)phenoxy]-propionic acid exhibit a 21 and 58% inhibition of edema, respectively.

In addition to their antiinflammatory activity, the compounds of the invention are also useful as analgesic agents due to their ability to alleviate pain in mammals. The activity of the compounds is demonstrated in the 2-phenyl-1,4-benzoquinone-induced writhing test in mice, a standard assay for analgesia [Proc. Soc. Exptl. Biol. Med., 95, 729 (1957)]. For example, at a dose of 50 mg./kg. of body weight, p-(4,5,6,7-tetrahydrobenzofuran-2-yl)phenoxyacetic acid and 2-[p-(4,5,6,7-tetrahydrobenzofuran-2-yl)phenoxy]propionic acid exhibit 39 and 60% inhibition of writhing, respectively. These data illustrate that compounds of this invention are useful as antiinflammatory and analgesic agents at the dose of 0.1–200 mg/kg. of body weight.

The compounds of the present invention may be administered to a patient by any convenient route such as orally, intramuscularly, subcutaneously, or intraperitoneally. The preferred route of administration is oral, for example, with an inert diluent or with an edible carrier or in gelatin capsules or tablets.

For the purpose of oral therapeutic administration, the active compounds of this invention may be incorporated with excipients and used in the form of tablets, troches, capsules, elixirs, suspensions, syrups, wafers, chewing gum, and the like. These preparations should contain at least 0.5% of active compound, but may be varied depending upon the particular form and may conveniently be between 7% to about 70% by weight of the unit. The amount of active compound in such compositions is such that a suitable dosage will be obtained. Preferred compositions and preparations according to the present invention are prepared so that an oral dosage unit form contains between 10 and 400 milligrams of active compound.

The tablets, pills, capsules, troches, and the like may also contain the following ingredients: a binder such as gum tragacanth or gelatin; an excipient such as starch or lactose, a disintegrating agent such as alginic acid, potato starch and the like; a lubricant such as magnesium stearate; and a sweetening agent such as sucrose or saccharin may be added or a flavoring agent such as peppermint, methyl salicylate, or orange flavoring. When the dosage unit form is a capsule, it may contain, in addition to materials of the above type, a liquid carrier such as a fatty oil. Other dosage unit forms may contain other various materials which modify the physical form of the dosage unit, for example, as coatings. Thus, tablets or pills may be coated with sugar, shellac, or both. A syrup may contain, in addition to the active compounds sucrose as a sweetening agent, and certain preservatives, dyes and colorings, and flavors. Materials used in preparing these various compositions must be pharmaceutically pure and non-toxic in the amounts utilized.

EXAMPLE 1 a. A solution of 43 g of p-hydroxyphenacylbromide in dimethylformamide is added slowly to a stirred solution of 30 g of 1-(1-pyrrolidino)-1-cyclohexene in dimethylformamide under nitrogen at 25° C. After 6½ hours at ambient temperature, water is added and the mixture is stirred overnight. The mixture is poured into 1.5 l. of water and extracted with chloroform. The chloroform is evaporated leaving a waxy solid. The solid is recrystallized from a 2% acetonitrile in ethanol solution to give 2-(p-hydroxyphenacyl)cyclohexanone as a solid.

b. A small quantity of anhydrous hydrogen chloride is added to a solution of 65.0 g of 2-(p-hydroxyphenacyl)cyclohexanone in absolute methanol. The mixture is refluxed for 3 hours. The methanol is evaporated, leaving a brown solid. The solid is dissolved in ether, the ether solution is washed with water and a saturated sodium chloride solution, and dried. The ether is removed leaving a yellow solid which is recrystallized from cyclohexane and an isopropyl ether-hexane mixture to give 2-(p-hydroxyphenyl)-4,5,6,7-tetrahydrobenzofuran as a yellow crystalline solid.

c. A mixture of 23.7 g of potassium carbonate, 12.84 g of 2-(p-hydroxyphenyl)-4,5,6,7-tetrahydrobenzofuran and 10.86 g of ethyl α-bromoacetate in 80 ml. of 2-butanone is stirred at reflux under nitrogen for 48 hours. The 2-butanone is removed under vacuum, water and chloroform are added, and the aqueous phase is extracted with chloroform. The chloroform solution is washed with water and saturated sodium chloride solution, and dried. The chloroform is removed to leave a yellow solid. The solid is recrystallized from hexane to give white crystals. Dry column chromatography followed by recrystallization from absolute ethanol gives ethyl p-(4,5,6,7-tetrahydrobenzofuran-2-yl)phenoxyacetate, m.p. 76°–77°C.

Analysis: Calculated for $C_{18}H_{20}O_4$: 71.97% C; 6.72% H. Found: 71.94% C; 6.82% H.

Replacing the ethyl α-bromoacetate with methyl α-bromoacetate and propyl α-bromoacetate yields the corresponding methyl p-(4,5,6,7-tetrahydrobenzofuran-2-yl)phenoxyacetate and propyl p-(4,5,6,7-tetrahydrobenzofuran-2-yl)-phenoxyacetate, respectively.

EXAMPLE 2

20 ml. of 10% sodium hydroxide aqueous solution are added to a solution of 1.24 g of ethyl p-(4,5,6,7-tetrahydrobenzofuran-2-yl)phenoxyacetate in tetrahydrofuran. The mixture is stirred at reflux for two hours, cooled to ambient temperature and acidified with dilute hydrochloric acid, and the tetrahydrofuran is removed under vacuum. The resulting white solid is filtered, washed with water and dried to give p-(4,5,6,7-tetrahydrobenzofuran-2-yl)phenoxyacetic acid, m.p. 188°–190°C.

Analysis: Calculated for $C_{16}H_{16}O_4$: 70.56% C; 5.93% H. Found: 70.59% C; 5.99% H.

EXAMPLE 3

A mixture of 23.7 g of potassium carbonate, 12.84 g of 2-(p-hydroxyphenyl)-4,5,6,7-tetrahydrobenzofuran and 10.86 g of ethyl α-bromopropionate in 80 ml. of 2-butanone is stirred at reflux for 48 hours. The reaction mixture is then permitted to cool to ambient temperature. The 2-butanone is removed under vacuum, the residue is treated with water and ether, and the aqueous layer is extracted with ether. The ether extract is washed with dilute sodium hydroxide, water, and a saturated sodium chloride solution, treated with charcoal, and dried. The ether is removed to leave a yellow oil which, upon cooling and scratching, gives a light yellow solid. The solid is recrystallized from absolute ethanol to give ethyl 2-[p-(4,5,6,7-tetrahydrobenzofuran-2-yl)phenoxy]propionate as a yellow crystalline solid, m.p. 56°–57°C.

Analysis: Calculated for $C_{19}H_{22}O_4$: 72.58% C; 7.07% H. Found: 72.78% C; 7.12% H.

Replacing the ethyl α-bromopropionate with ethyl α-bromobutyrate yields the corresponding ethyl 2-[p-(4,5,6,7-tetrahydrobenzofuran-2-yl)phenoxy]butyrate.

EXAMPLE 4

A solution of 2 g of potassium hydroxide in 5 ml. of water is added to a solution of 8.74 g of ethyl 2-[p-(4,5,6,7-tetrahydrobenzofuran-2-yl)phenoxy]propionate in 30 ml. of tetrahydrofuran. The mixture is refluxed for five hours. The mixture is allowed to cool to ambient temperature and is acidified with hydrochloric acid. The tetrahydrofuran is removed under vacuum to leave a tan solid. The solid is filtered, washed with water and dried. The solid is recrystallized from benzene to give 2-[p-(4,5,6,7-tetrahydrobenzofuran-2-yl)phenoxy]propionic acid as a white solid, m.p. 170°–173°C.

Analysis: Calculated for $C_{17}H_{18}O_4$: 71.30% C; 6.35% H. Found: 71.12% C; 6.42% H.

The corresponding 2-[p-(4,5,6,7-tetrahydrobenzofuran-2-yl)phenoxy]butyric acid is obtainable by a similar procedure in which ethyl 2-[p-(4,5,6,7-tetrahydrobenzofuran-2-yl)phenoxy]-propionate is replaced by ethyl 2-[p-(4,5,6,7-tetrahydrobenzofuran-2-yl)phenoxy]butyrate.

EXAMPLE 5

A. A mixture of 20 g of potassium carbonate, 10.71 g of 2-(p-hydroxyphenyl)-4,5,6,7-tetrahydrobenzofuran [Example 1(b)], and 11.45 g of methyl α-bromophenylacetate in 65 ml. of 2-butanone is stirred at reflux for 72 hours. The 2-butanone is removed under vacuum and the residue is treated with water and extracted with ethyl acetate. The ethyl acetate is removed to leave a red oil that solidifies to a tan solid upon trituration with hexane-ether and cooling. The solid is filtered, washed with hexane and dried. The dried solid is recrystallized from methanol to give methyl 2-[p-(4,5,6,7-tetrahydrobenzofuran-2-yl)phenoxy]-2-phenylacetate as brown crystals, m.p. 104°–106°C.

B. A solution of 1.2 g of potassium hydroxide in 10 ml. of water is added to a stirred solution of 4 g of the above ester in 10 ml. of tetrahydrofuran. The mixture is refluxed for several days until TLC shows the presence of no ester. Most of the tetrahydrofuran is removed under vacuum and the resulting solid is redissolved in water and acidified with dilute hydrochloric acid. The mixture is extracted with chloroform, and the chloroform solution is washed with water and a saturated sodium chloride solution and dried over sodium sulfate. The chloroform is removed to give a tan solid. The solid is recrystallized from a benzene-hexane mixture to give 2-[p-(4,5,6,7-tetrahydrobenzofuran-2-yl)phenoxy]-2-phenylacetic acid, m.p. 146°–152°C.

Analysis: Calculated for $C_{22}H_{20}O_4$: 75.83% C; 5.79% H. Found: 75.96% C; 5.82% H.

EXAMPLE 6

16.6 g of chloroform are added to a mixture of 21.43 g of 2-(p-hydroxyphenyl)-4,5,6,7-tetrahydrobenzofuran [Example 1(b)], 23.3 g of pulverized sodium hydroxide and 100 g of acetone. The mixture is stirred briefly at ambient temperature, then briefly heated to produce a thick mass. The mixture is refluxed for 3 hours and an additional 1 g of chloroform and 50 ml. of acetone is added. The mixture is refluxed for an additional 8 hours and allowed to sit at ambient temperature overnight. The acetone is removed under vacuum and the residue is dissolved in water, acidified with dilute hydrochloric acid and extracted with ether. The ether solution is extracted with sodium bicarbonate solution, the bicarbonate solution is washed with ether, acidified, and extracted again with ether. The ether solution is treated with charcoal and dried. The ether is removed to leave a reddish oil which solidifies to a tan solid. The solid is triturated with hexane and filtered. The solid is recrystallized from a methanol-water mixture and from hexane to give 2-methyl-2-[p-(4,5,6,7-tetrahydrobenzofuran-2-yl)phenoxy]propionic acid as soft white needles, m.p. 116°–118°C.

Analysis: Calculated for $C_{18}H_{20}O_4$: 71.96% C; 6.72% H. Found: 71.66% C; 6.73% H.

EXAMPLE 7

By following the manipulative procedure described in Example 1, substituting 4-t-butyl-1-pyrrolidino-1-cyclohexene for 1-(1-pyrrolidino)-1-cyclohexene produces ethyl p-(5-t-butyl-4,5,6,7-tetrahydrobenzofuran-2-yl)phenoxyacetate.

EXAMPLE 8

By following the manipulative procedure described in Example 2, substituting ethyl p-(5-t-butyl-4,5,6,7-tetrahydrobenzofuran-2-yl)phenoxyacetate for ethyl p-(4,5,6,7-tetrahydrobenzofuran-2-yl)phenoxyacetate produces p-(5-t-butyl-4,5,6,7-tetrahydrobenzofuran-2-yl)phenoxyacetic acid.

EXAMPLE 9

By following the manipulative procedure described in Example 1, substituting 4-methyl-1-pyrrolidino-1-cyclohexene for 1-(1-pyrrolidino)-1-cyclohexene produces ethyl p-(5-methyl-4,5,6,7-tetrahydrobenzofuran-2-yl)phenoxyacetate.

EXAMPLE 10

By following the manipulative procedure described above in Example 2, substituting ethyl p-(5-methyl-4,5,6,7-tetrahydrobenzofuran-2-yl)phenoxyacetate for ethyl p-(4,5,6,7-tetrahydrobenzofuran-2-yl)phenoxyacetate produces p-(5-methyl-4,5,6,7-tetrahydrobenzofuran-2-yl)phenoxyacetic acid.

I claim:

1. A compound of the formula

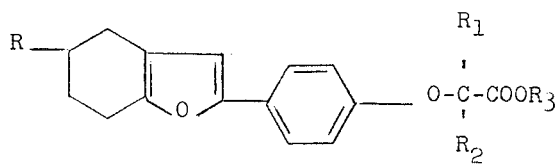

in which R is hydrogen or alkyl of from 1 to 4 carbon atoms; $R_1$ is hydrogen, methyl or ethyl; $R_2$ is hydrogen, methyl, ethyl or phenyl; and $R_3$ is hydrogen or alkyl of from 1 to 3 carbon atoms.

2. A compound as defined in claim 1, wherein R is hydrogen, methyl or t-butyl and $R_2$ is hydrogen, methyl or phenyl.

3. The compound defined in claim 2, which is 2-[p-(4,5,6,7-tetrahydrobenzofuran-2-yl)phenoxy]propionic acid.

4. The compound defined in claim 2, which is p-(4,5,6,7-tetrahydrobenzofuran-2-yl)phenoxyacetic acid.

* * * * *